(12) United States Patent
Sun et al.

(10) Patent No.: US 12,432,335 B2
(45) Date of Patent: Sep. 30, 2025

(54) IMAGE DISPLAY METHOD, DEVICE, APPARATUS, AND COMPUTER-READABLE STORAGE MEDIUM

(71) Applicant: Lenovo (Beijing) Limited, Beijing (CN)

(72) Inventors: Chenfei Sun, Beijing (CN); Xilong Zhou, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 64 days.

(21) Appl. No.: 18/484,521

(22) Filed: Oct. 11, 2023

(65) Prior Publication Data
US 2024/0179292 A1    May 30, 2024

(30) Foreign Application Priority Data
Nov. 28, 2022  (CN) .......................... 202211504507.1

(51) Int. Cl.
*H04N 13/383* (2018.01)
*H04N 13/302* (2018.01)
*H04N 13/398* (2018.01)

(52) U.S. Cl.
CPC ......... *H04N 13/383* (2018.05); *H04N 13/302* (2018.05); *H04N 13/398* (2018.05)

(58) Field of Classification Search
CPC ... H04N 13/383; H04N 13/302; H04N 13/398
See application file for complete search history.

(56) References Cited

U.S. PATENT DOCUMENTS

| | | | |
|---|---|---|---|
| 9,117,384 B2* | 8/2015 | Phillips | G06F 3/012 |
| 10,623,714 B2* | 4/2020 | Sumi | H04N 13/376 |
| 10,817,055 B2* | 10/2020 | Sumi | H04N 13/111 |
| 2016/0078592 A1* | 3/2016 | Kim | G09G 5/395 |
| | | | 345/619 |
| 2018/0343428 A1* | 11/2018 | Lei | G06F 3/013 |

* cited by examiner

*Primary Examiner* — Gims S Philippe
(74) *Attorney, Agent, or Firm* — ANOVA LAW GROUP, PLLC

(57) ABSTRACT

An image display method includes obtaining first position information of eyes of an image observer and second position information of a curved display screen, determining third position information corresponding to a virtual flat display screen based on the first position information and the second position information, determining a mapping relationship between screen pixel points of the curved display screen and reference pixel points of the virtual flat display screen based on the first position information and the third position information, determining corresponding projection pixel values, on the curved display screen, of a target image according to the mapping relationship, and displaying the target image on the curved display screen according to the projection pixel values.

17 Claims, 7 Drawing Sheets

IMAGE DISPLAY METHOD, DEVICE, APPARATUS, AND COMPUTER-READABLE STORAGE MEDIUM

CROSS-REFERENCE TO RELATED APPLICATION

This application claims priority to Chinese Patent Application No. 202211504507.1, filed on Nov. 28, 2022, the entire content of which is incorporated herein by reference.

TECHNICAL FIELD

The present disclosure generally relates to the field of image display technologies and, more particularly, to an image display method, device, apparatus, and a computer-readable storage medium.

BACKGROUND

Development of image display technology, especially the emergence of three-dimensional image display technology, has brought users a better visual experience. The emergence of naked-eye three-dimensional (three-dimensional) image display technology removes constraints of previous three-dimensional glasses, and improves the users' experience of viewing three-dimensional images.

The naked-eye three-dimensional image display technology is based on ordinary platform displays. By disposing light-splitting components, such as covering a flat display with a film with lenses, an image is split during display, such that the left eye and right eye of a person receive different images to achieve the three-dimensional display effect. However, since ordinary monitors are usually flat displays, there are limitations in viewing angles, which reduces the users' visual experience.

SUMMARY

In accordance with the present disclosure, there is provided an image display method including obtaining first position information of eyes of an image observer and second position information of a curved display screen, determining third position information corresponding to a virtual flat display screen based on the first position information and the second position information, determining a mapping relationship between screen pixel points of the curved display screen and reference pixel points of the virtual flat display screen based on the first position information and the third position information, determining corresponding projection pixel values, on the curved display screen, of a target image according to the mapping relationship, and displaying the target image on the curved display screen according to the projection pixel values.

Also in accordance with the present disclosure, there is provided an image display apparatus including a memory storing instructions and a processor configured to execute the instructions to obtain first position information of eyes of an image observer and second position information of a curved display screen, determine third position information corresponding to a virtual flat display screen based on the first position information and the second position information, determine a mapping relationship between screen pixel points of the curved display screen and reference pixel points of the virtual flat display screen based on the first position information and the third position information, determine corresponding projection pixel values, on the curved display screen, of a target image according to the mapping relationship, and display the target image on the curved display screen according to the projection pixel values.

Also in accordance with the present disclosure, there is provided a non-transitory computer-readable storage medium storing instructions that, when executed by a processor, cause the processor to obtain first position information of eyes of an image observer and second position information of a curved display screen, determine third position information corresponding to a virtual flat display screen based on the first position information and the second position information, determine a mapping relationship between screen pixel points of the curved display screen and reference pixel points of the virtual flat display screen based on the first position information and the third position information, determine corresponding projection pixel values, on the curved display screen, of a target image according to the mapping relationship, and display the target image on the curved display screen according to the projection pixel values.

DETAILED DESCRIPTION OF THE EMBODIMENTS

Hereinafter, embodiments and features consistent with the present disclosure will be described with reference to drawings.

Various modifications may be made to the embodiments of the present disclosure. Thus, the described embodiments should not be regarded as limiting, but are merely examples. Those skilled in the art will envision other modifications within the scope and spirit of the present disclosure.

The accompanying drawings, which are incorporated in and constitute a part of this specification, illustrate embodiments of the present disclosure and, together with the general description of the present disclosure above and the detailed description of the embodiments below, serve to explain the principle of the present disclosure.

These and other features of the present disclosure will become apparent from the following description of non-limiting embodiments with reference to the accompanying drawings.

Although the present disclosure is described with reference to some specific examples, those skilled in the art will be able to realize many other equivalents of the present disclosure.

The above and other aspects, features, and advantages of the present disclosure will become more apparent in view of the following detailed description when taken in conjunction with the accompanying drawings.

Specific embodiments of the present disclosure are hereinafter described with reference to the accompanying drawings. The described embodiments are merely examples of the present disclosure, which may be implemented in various ways. Specific structural and functional details described herein are not intended to limit, but merely serve as a basis for the claims and a representative basis for teaching one skilled in the art to variously employ the present disclosure in substantially any suitable detailed structure.

In the present disclosure, the phrases such as "in one embodiment," "in another embodiment," "in yet another embodiment," or "in other embodiments," may all refer to one or more of different embodiments in accordance with the present disclosure.

The present disclosure provides an image display method. The image display method may be applied to a control device. The control device may be a device including a cell phone, a laptop computer, or a desktop computer.

Figure 1:
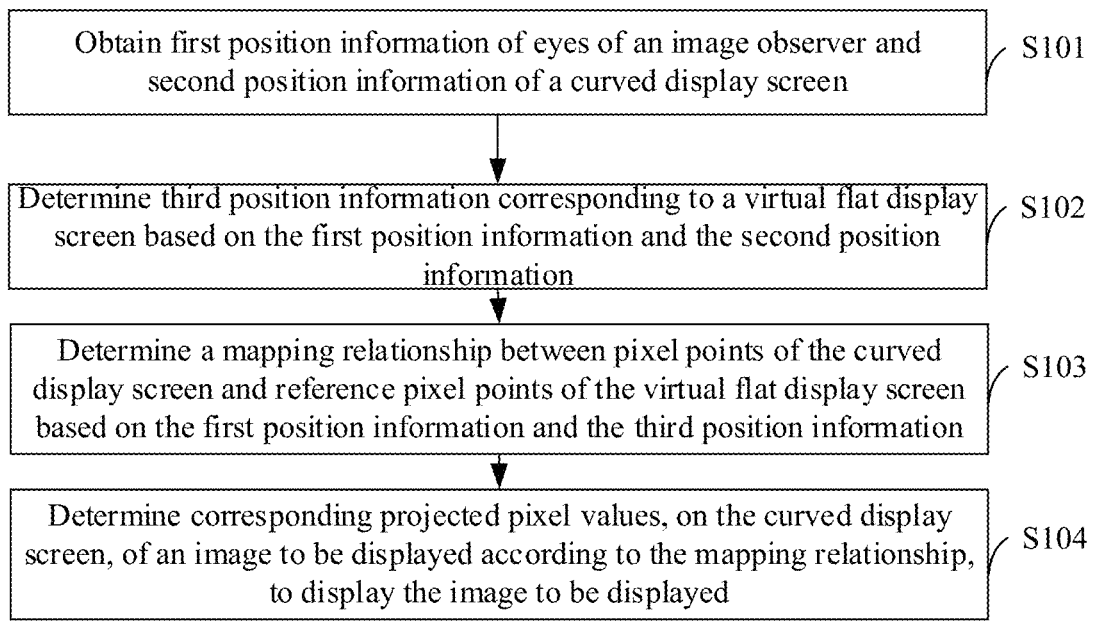
FIG. 1 is a flow chart of an image display method consistent with the present disclosure.

FIG. 1 is a flow chart of an image display method provided by one embodiment of the present disclosure. In the embodiment shown in FIG. 1, the image display method includes S101 to S104.

In S101, first position information of eyes of an image observer and second position information of a curved display screen are obtained.

The image observer may be a user who views an image to be displayed (also referred to as a "target image") through the curved display screen, and the image observer may be located at a position opposite to the curved display screen. For example, the image observer may stand or sit in front of the curved display screen. The first position information of the eyes of the image observer may include positions of the two eyes of the image observer, interpupillary distance, distance from any position on the curved display screen, etc. The curved display screen may be a naked-eye three-dimensional display screen, and the second position information of the curved display screen may include a position of the curved display screen, position information of any position on the curved display screen, etc.

In some embodiments, an image acquisition device may be disposed at the curved display screen, for example, disposed above the curved display screen. The image acquisition device may acquire an image of the image observer located at a position opposite to the curved display screen, and then the acquired image of the image observer may be analyzed and processed to obtain the first position information of the eyes of the image observer. The first position information may be sent to the control device. The position of the curved display screen may be set in advance, such that the second position information of the curved display screen may be obtained in advance and saved in a storage area corresponding to the control device.

In S102, third position information corresponding to a virtual flat display screen is determined according to the first position information and the second position information.

In some embodiments, the virtual flat display screen may be a flat display screen located between the curved display screen and the image observer, and the flat display screen may be virtual. After obtaining the position information of the image observer and the position information of the curved display screen, the position of the virtual flat display screen may be determined. For example, the virtual flat display screen may be set at a position at the middle of the eyes of the image observer and the curved surface display screen, or at a position between the curved display and the image observer but closer to the curved display screen. In some embodiments, when the virtual flat display screen is a naked-eye three-dimensional display screen, the images to be displayed may be displayed in the naked-eye three-dimensional format through the flat display screen, and the image observer located in front of the flat display screen is able to observe the three-dimensional image.

In S103, a mapping relationship between pixel points of the curved display screen and reference pixel points of the virtual flat display screen is determined according to the first position information and the third position information.

In some embodiments, the pixel points of the curved display screen (in this disclosure, the pixel points of the curved display screen is also referred to as "screen pixel points") and the reference pixel points of the virtual flat display screen may both be the smallest light-emitting units on the display screens, and may be able to display the image to be displayed. After determining the position information of the virtual flat display screen, the mapping relationship between the pixel points on the curved display screen and the reference pixel points on the virtual flat display screen may be determined based on the position information of the eyes of the image observer and the position information of the virtual flat display screen. In practice, there may be a one-to-one correspondence between the pixel points on the curved display and the reference pixel points on the virtual flat display. A projection pixel value of the image at one pixel point on the curved display may be the same as a projection pixel value of the image at one corresponding reference pixel point on the virtual flat display.

In S104, corresponding projection pixel values, on the curved display screen, of the image to be displayed are determined based on the mapping relationship, and the image to be displayed is displayed on the curved surface display screen according to the projection pixel values.

The image to be displayed may be an image or a video image frame for display. When the curved display screen is the naked-eye three-dimensional display, the image to be displayed may be displayed in the naked-eye three-dimensional format through the curved display screen. The projection pixel values corresponding to the image to be displayed on the curved display screen may be the corresponding pixel values when the image to be displayed is displayed on the curved display screen. Each projection pixel value may correspond to one pixel point of the curved display screen.

In some embodiments, after obtaining the mapping relationship between the pixel points of the curved display screen and the reference pixel points of the virtual flat display screen, the projection pixel values on the curved display screen may be determined based on the mapping relationship. The mapping relationship may represent the correspondence between the reference pixel points on the virtual plane and the pixel points on the curved display screen. Through this correspondence, the projection pixel values at the corresponding pixel points on the curved display screen may be determined based on the projection pixel values of the image to be displayed at the reference pixel points on the virtual plane display, to display the image to be displayed based on each projection pixel value.

In the present embodiment, the first position information of the eyes of the image observer and the second position information of the curved display screen may be determined. Then, based on the first position information and the second position information, the corresponding third position information of the virtual flat display screen may be determined. The mapping relationship between the pixel points of the curved display screen and the reference pixel points of the virtual flat display screen may be determined according to the first position information and the third position information. The corresponding projection pixel values, on the curved display screen, of the image to be displayed may be determined based on the mapping relationship, such that the image to be displayed may be displayed on the curved surface display screen according to the projection pixel values. Therefore, according to the position information of the eyes of the image observer and the position information of the virtual flat display screen, the mapping relationship between the pixel points of the curved display screen and the reference pixel points of the virtual flat display screen may be determined, and the pixel values, on the curved display screen, of the image to be displayed may be determined based on the mapping relationship, such that the image to be displayed may be displayed on the curved surface display screen according to the projection pixel values. The display effect of the image to be displayed may be ensured and the user's visual experience may be improved.

In some embodiments, the first position information may include left eye position information and right eye position information of the image observer. Correspondingly, determining the mapping relationship between the pixel points of the curved display screen and the reference pixel points of the virtual flat display screen according to the first position information and the third position information in S103 may include S1031 to S1033.

In S1031, based on the left eye position information, right eye position information and the third position information, a first reference pixel point set on the virtual flat display screen corresponding to the left eye and a second reference pixel point set on the virtual flat display screen corresponding to the right eye are determined.

In some embodiments, the virtual flat display screen may be a naked-eye three-dimensional display screen, and the naked-eye three-dimensional display may be performed through the display screen. According to the position information of the virtual display screen, the position information of the left eye and the position information of the right eye, each pixel point on the virtual display screen that can be observed by the left eye of the image observer, that is, the first reference pixel point set, may be determined; and also, each pixel point on the virtual display screen that can be observed by the right eye of the image observer, that is, the second reference pixel point set, may be determined.

Figure 2:
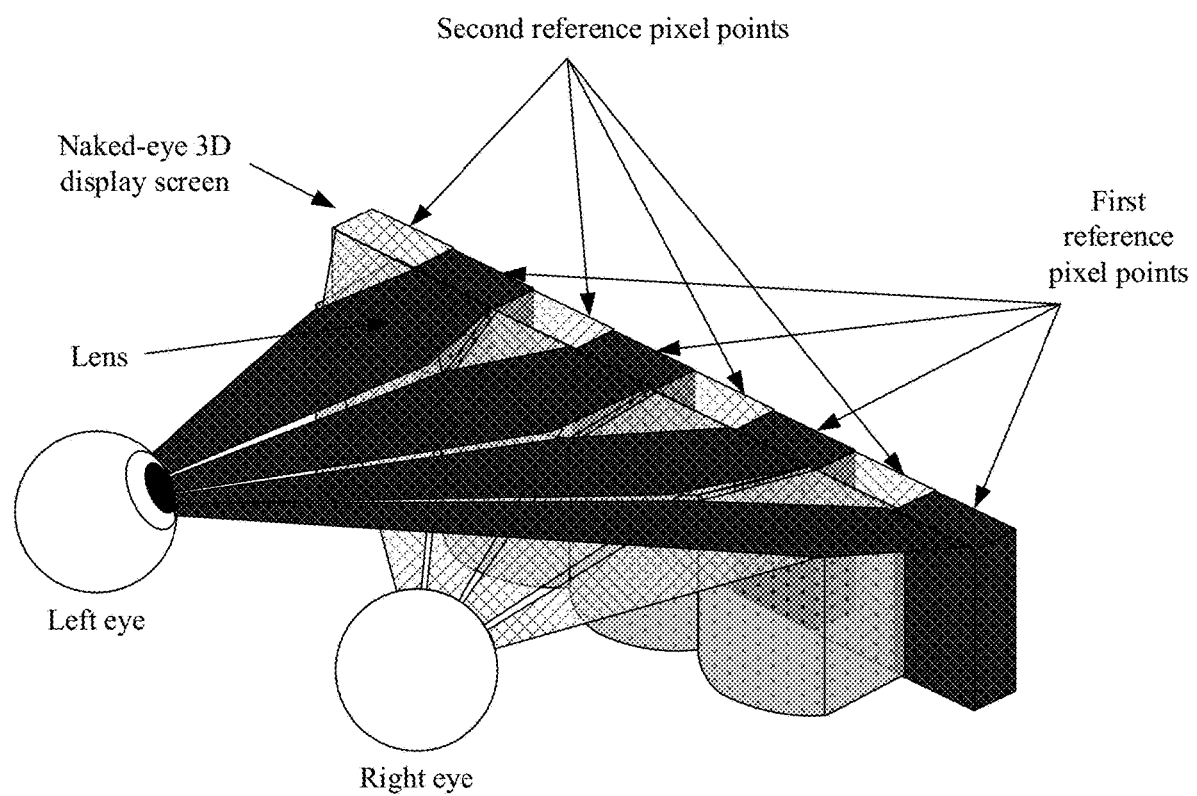
FIG. 2 is a schematic structural diagram of a naked-eye three-dimensional display screen consistent with the present disclosure.

For example, in one embodiment shown in FIG. 2, when the virtual flat display screen is a naked-eye three-dimensional display screen, a plurality of lenses is provided on the display screen. When the position information of the virtual flat display screen is determined, the position of each lens may be also determined. Whether each projection pixel point of the image to be displayed converges to the left eye or the right eye after refracted by each lens may be determined, combined with the refractive index of each lens, as well as the left eye position information and the right eye position information. Therefore, the first reference pixel point set corresponding to the left eye on the virtual flat display screen, and the second reference pixel point set corresponding to the right eye on the virtual flat display screen may be determined.

In S1032, target position information of each first target pixel point corresponding to the left eye on the curved display screen, and target position information of each second target pixel point corresponding to the right eye on the curved display screen, are determined. In this disclosure, the target position information of a first target pixel point is also referred to as "first target position information" and the target position information of a second target pixel point is also referred to as "second target position information."

In some embodiments, when the position information of the curved display screen is known, the position information of each pixel point on the curved display screen may also be obtained. Further, according to the left eye position information, the right eye position information and a distance between the eyes and the curved display screen, a plurality of first target pixel points corresponding to the left eye on the curved display screen and the target position information of each of the plurality of first target pixel points, as well as a plurality of second target pixel points corresponding to the right eye on the curved surface display screen and target position information of each of the plurality of second target pixel points may be determined.

In S1033, a mapping relationship between each first reference pixel point and one corresponding first target pixel point is determined based on the position information of each first reference pixel point and the target position information of each first target pixel point corresponding to the left eye on the curved display screen, and a mapping relationship between each second reference pixel point and one corresponding second target pixel point is determined based on the position information of each second reference pixel point and the target position information of each second target pixel point corresponding to the left eye on the curved display screen.

In some embodiments, there may be a mapping relationship between each first reference pixel point corresponding to the left eye and one corresponding first target pixel point corresponding to the left eye, and there may be a mapping relationship between each second reference pixel point corresponding to the right eye and one corresponding second target pixel point corresponding to the right eye. According to the position information of the plurality of first reference pixel points and the position information of the plurality of first target pixel points, the correspondence between each first reference pixel point and one corresponding first target pixel point may be determined. Similarly, according to the position information of the plurality of second reference pixel points and the position information of the plurality of second target pixel points, the correspondence between each second reference pixel point and one corresponding second target pixel point may be determined.

In the embodiments of the present disclosure, the reference pixel points corresponding to the left eye and the right eye on the virtual flat display screen, and the position information of the target pixel points corresponding to the left eye and the right eye on the curved display screen, may be determined. Based on the position information of the reference pixel points and the position information of the target pixel points, the mapping relationship between the reference pixel points and the corresponding target pixel points may be obtained to achieve a complete and effective mapping between the virtual flat display screen and the curved display screen, to provide the basis for naked-eye three-dimensional display of curved displays.

In some embodiments of the present disclosure, in S1033, based on the position information of each first reference pixel point and the target position information of each first target pixel point, the mapping relationship between each first reference pixel point and one corresponding first target pixel point may be determined through S201 to S204.

In S201, position information of the i-th first reference pixel point may be obtained, and a first connection line between the i-th first reference pixel point and the left eye may be determined according to the position information of the i-th first reference pixel point and the left eye position information.

In the present embodiment, i is a positive integer. When the number of first reference pixel points on the virtual display screen is N (N is an integer greater than zero), i may be greater than zero and less than or equal to N. In some embodiments, according to the position information of the virtual flat display screen, the position information of the i-th first reference pixel point may be obtained. According to the position information of the i-th first reference pixel point and the position information of the left eye, the line connecting the i-th first reference pixel point and the left eye, for example, the pupil center of the left eye, may be determined, that is, the first connection line.

In S202, candidate position information of the intersection point of the first connection line and the curved display screen may be determined.

In some embodiments, the virtual flat display screen may be set between the eye of the image observer and the curved display screen. By extending the first connection line between the i-th first reference pixel point and the left eye, the intersection point of the first line and the curved display screen may be obtained, and the position information of the intersection point, that is, the candidate position information, may be determined. In one embodiment, the candidate position information of the intersection point may be the position coordinates of the intersection point. After obtaining the position coordinates of the i-th first reference pixel point, the position coordinates of the left eye, and the distance of the left eye from the virtual flat display screen, the position coordinates of the intersection point may be determined.

Figure 3:
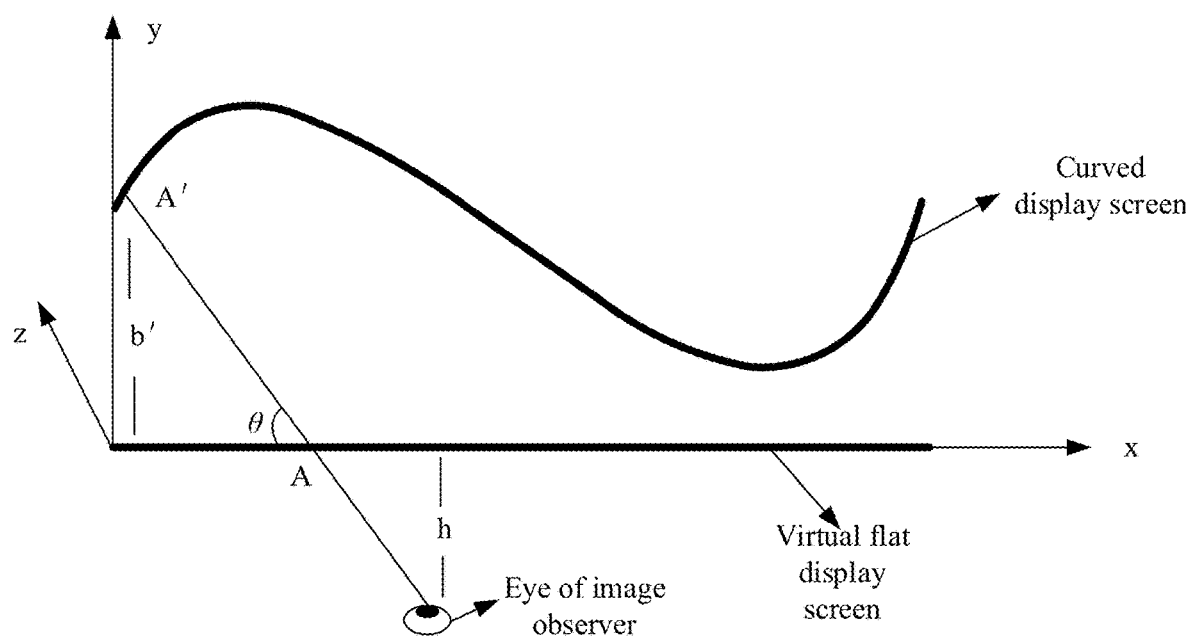
FIG. 3 is a schematic diagram of relative positions of a curved display screen, a virtual flat display screen, and an image viewer consistent with the present disclosure.

In one embodiment, as shown in FIG. 3, a three-dimensional rectangular coordinate system is established on the virtual flat display screen parallel to the eyes and at the same horizontal position. The three-dimensional rectangular coordinate system uses the horizontal direction of the virtual flat display screen as the x-axis, the vertical direction as the z-axis, and a direction perpendicular to the virtual flat display screen as the y-axis. When the position coordinates of the i-th first reference pixel point A are (a, 0, 0), the position coordinates of the left eye are (x, h, 0), the position coordinates of the intersection point A' between the i-th reference pixel point A and the curved display screen are (a', b', 0), h is the distance between the eyes and the virtual flat display, and b' is the distance between the intersection point A' and the virtual flat display screen, the position coordinate values a' and b' of the intersection point A' may be determined in the following way.

When the angle between the first connection line and the virtual flat display screen is θ, as shown in FIG. 3, it may be obtained that tan θ=h/(x−a) according to geometry relationship, and the angle may be determined as $$\theta = \arctan\left(\frac{h}{x-a}\right); \quad (1)$$

according to the arc tangent.

Also, the diagonal angle of the angle between the first connection line and the virtual flat display screen may also be θ, it may be obtained that $$\tan \theta = b'/(a-a') \quad (2),$$

according to the geometry relationship.
Further, it may be obtained that $$\frac{a-a'}{x-a} = \frac{b'}{h}. \quad (3)$$

Therefore, the position coordinates a' and b' of the intersection point A' may be obtained according to above formula (1), (2) and (3).

In S203, a j-th first reference pixel point with position information same as the candidate position information may be determined, to determine that the i-th first reference pixel point corresponds to the j-th first target pixel point.

In some embodiments, j is a positive integer. When the number of first target pixel points corresponding to the left eye on the curved display screen is M (M is an integer greater than zero), j may be greater than zero and less than or equal to M. After determining the candidate position information of the intersection point of the i-th first reference pixel point and the curved display screen, the candidate position information may be compared with each first target pixel point respectively. When it is determined that the target position information of the j-th first target pixel point is the same as the candidate position information, it may be determined that the i-th first reference pixel point corresponds to the j-th first target pixel point, where i and j may be the same or different. In one embodiment, that the candidate position information of the intersection point is the same as the target position information of the j-th first target pixel point may be that the position coordinates of the intersection point is the same as the position coordinates of the j-th first target pixel point.

In S204, based on the position information of the i-th first reference pixel point and the target position information of the j-th first target pixel point, a mapping relationship between the i-th first reference pixel point and the j-th first target pixel point is established.

In some embodiments, after determining that there is a correspondence between the i-th first reference pixel point and the j-th first target pixel point, the mapping relationship between the i-th first reference pixel point and the j-th first target pixel point may be established according to their position information. For example, in one embodiment, the position coordinates of the i-th first reference pixel point and the j-th first target pixel point may be stored to establish a mapping table between each first reference pixel point and one corresponding first target pixel point. When it is determined that the image to be displayed needs to be displayed on the curved display screen, the corresponding first target pixel point and the projection pixel value of the image to be displayed between the first target pixel point may be determined based on the projection pixel value of the image to be displayed at the first reference pixel point on the virtual flat display screen and the mapping table.

In some embodiments, the method in S201 to S204 may be also used to determine the mapping relationship between each second reference pixel point and one corresponding second target pixel point. In one embodiment, during implementation, the first reference pixel points on the virtual display screen may be traversed in sequence to determine the corresponding first target pixel points on the curved display screen, and the second reference pixel points on the virtual display screen may be traversed in sequence to determine the corresponding second target pixel points on the curved surface display, therefore establishing a complete mapping relationship between each reference pixel point on the virtual display screen and one corresponding target pixel point on the curved display screen. The subsequent rapid determination of the projection pixel values of the image to be displayed the curved surface display may be achieved based on the complete mapping relationship, for displaying the image to be displayed on the curved display screen.

In the present disclosure, by determining the intersection point between the connection line from one reference pixel point to the eye on the virtual display screen and the curved display screen, one target pixel point whose position information is the same as the position information of the intersection point may be determined as one pixel point corresponding to the reference pixel point on the virtual display screen. And, based on the position information of the reference pixel point and the position information of the corresponding target pixel point, one mapping relationship between the reference pixel point and the target pixel point may be established, such that the projection pixel values, on the curved display screen, of the image to be displayed may be determined based on the mapping relationship to display the image to be displayed on the curved display screen.

In some embodiments, determining the projection pixel values, on the curved display screen, of the image to be displayed based on the mapping relationship in S104 may be realized through S301 to S302.

In S301, a first projection pixel value of the image to be displayed at each first reference pixel point may be obtained, and a second projection pixel value of the image to be displayed at each second reference pixel point may be obtained.

In some embodiments, a projection pixel value may be an image pixel value at one corresponding reference pixel point when displaying the image to be displayed using a virtual flat display screen. The first projection pixel values may be image pixel values that can be observed by the left eye of the image observer. The second projection pixel values may be the image pixel values that can be observed by the right eye of the image observer. When the position information of the virtual display screen and the position information of the eyes of the image observer are determined, the first projection pixel value of the image to be displayed at each first reference pixel point on the virtual display screen and the second projection pixel value of the image to be displayed at each second reference pixel point on the virtual display screen may be obtained.

In S302, each first projection pixel value may be determined as the projection pixel value of one corresponding first target pixel point, and each second projection pixel value may be determined as the projection pixel value of one corresponding second target pixel point.

In some embodiments, there may be the mapping relationship between the reference pixel points and the target pixel points, that is, the projection pixel value at each reference pixel point may be the same as the projection pixel value at one corresponding target pixel point. Therefore, after obtaining the first projection pixel value at each first reference pixel point and the second projection pixel value at each second reference pixel point, each first projection pixel value may be determined as the projection pixel value of one corresponding first target pixel point, and each second projection pixel value may be determined as the projection pixel value of one corresponding second target pixel point, according to the mapping relationship between the reference pixel points and the target pixel points.

In some embodiments, determining the third position information corresponding to the virtual flat display screen based on the first position information and the second position information in S102 may be realized through S1021 to S1022.

In S1021, a closest position on the curved display screen to the eye of the image observer may be determined as a candidate position.

In some embodiments, the closest position on the curved display screen to the eye of the image observer may be any point on the curved display screen. When determining the closest position on the curved display screen to the eye of the image observer, a line between the pupil center of the left eye and the pupil center of the right eye of the image observer may be determined first, and then the closest position on the curved display screen to the line may be determined and used as the candidate position.

In S1022, the third position information corresponding to the virtual flat display screen may be determined based on the positions of the eyes and the candidate position.

In some embodiments, a position corresponding to the third position information, i.e., a third position, may be the position of the virtual display screen. After determining the candidate position on the curved display screen closest to the eyes, the position of the virtual flat display screen may be determined based on the positions of the eyes and the candidate position. In one embodiment, the virtual flat display screen may be located between the eyes of the image observer and the curved display screen, and maintain a certain preset distance from the image observer, to ensure that the image observer is able to view better naked-eye three-dimensional images when the virtual flat display screen is used to display the image to be displayed.

In some embodiments, determining the third position information corresponding to the virtual flat display screen based on the positions of the eyes and the candidate position, i.e., S1022, may be realized through S401 to S402.

In S401, a middle position between the positions of the eyes and the candidate position is determined.

In some embodiments, when determining the middle position between the positions of the eyes and the candidate position, the connection line between the pupil center of the left eye and the pupil center of the right eye of the image observer may be determined first, and then a segment passing through the candidate position and perpendicular to the connection line may be determined. The midpoint of the segment perpendicular to the connection line may be determined as the middle position between the positions of the eyes and the candidate position.

In S402, the middle position between the positions of the eyes and the candidate position may be determined as the third position corresponding to the virtual flat display screen.

In some embodiments, after determining the middle position between the positions of the eyes and the candidate position, the middle position may be determined as the third position corresponding to the virtual flat display screen. In one embodiment, the virtual flat display screen may be located at a position opposite to the image observer. T ensure a better viewing effect when using the virtual flat display screen and the curved display screen for naked-eye three-dimensional display, the virtual flat display screen may be set parallel to the image observer and the curved surface display screen. For example, in one embodiment, the virtual flat display screen may be set in the middle position between the positions of the eyes and the candidate position, and perpendicular to the vertical segment of the connection line between the candidate position and the center of the two pupils, thereby ensuring that the virtual flat display screen is parallel to the image observer and the curved display screen.

In some other embodiments, the virtual flat display screen may be disposed at other positions between the positions of the eyes and the candidate position, for example, at one-third or three-quarters of the way between the positions of the eyes and the candidate position. When determining the position of the virtual flat display screen, it may be sufficient to ensure that a good naked-eye three-dimensional experience is able to be achieved when the image observer views the image to be displayed through the virtual flat display screen.

In some embodiments, after determining the third position information corresponding to the virtual flat display screen based on the first position information and the second position information in S102, the method may further include S501 to S503.

In S501, a control instruction for displaying naked-eye three-dimensional images using the curved display screen may be received.

The curved display screen may be able to display two-dimensional images or three-dimensional images. The control instruction may indicate that the curved display screen needs to be used for naked-eye three-dimensional image display. The control instruction may be received by a control device, and the control device may be used to realize the naked-eye three-dimensional image display control operation on the curved display screen, such that the curved display screen performs naked-eye three-dimensional display of the image to be displayed.

In some embodiments, the control instructions for naked-eye three-dimensional image display using the curved display screen may be sent by the user or the image observer through the corresponding operating controls on the control device according to their own viewing needs. When the operating controls are triggered, the control device may receive the control instruction.

In S502, in response to the control instruction, the mapping relationship between the pixel points of the curved display screen and the reference pixel points of the virtual flat display screen may be determined based on the first position information and the third position information.

In some embodiments, after receiving the control instruction for naked-eye three-dimensional image display using the curved display screen, in response to the control instruction, the mapping relationship between the pixel points of the curved display screen and the reference pixel points of the virtual flat display screen may be obtained according to the position information of the eyes of the image observer and the position information of the virtual flat display screen. In one embodiment, different image observers may have different viewing needs for the image to be displayed, some image observers may not have the need to view naked-eye three-dimensional images. Therefore, before receiving the control instruction for displaying naked-eye three-dimensional images using the curved display screen, there may be no need to determine the mapping relationship between the reference pixel points of the virtual flat display and the pixel points of the curved display screen.

In some embodiments, since there may be differences in the first position information of the eyes of different observers, the reference pixel points on the virtual flat display screen respectively corresponding to the left eyes and the right eyes may be different, and the mapping relationship between the pixel points of the curved display screen and the reference pixel points of the virtual flat display screen may be also different. When the mapping relationship between the pixel points of the curved display screen and the reference pixel points of the virtual flat display screen is determined according to the position information of the current image observer and the current image observer does not have need to view naked-eye three-dimensional images using the curved display screen, the projection pixel values on the curved display screen determined from the mapping relation ship may not be able to ensure naked-eye three-dimensional image viewing experience of next image observer even when the next image observer has need to view naked-eye three-dimensional images using the curved display screen.

In S503, the corresponding projection pixel values, on the curved display screen, of the image to be displayed may be determined according to the mapping relationship and the image to be displayed may be displayed on the curved display screen according to the projection pixel values.

In some embodiments, after obtaining the mapping relationship between the pixel points of the curved display screen and the reference pixel points of the virtual flat display screen, the projection pixel values of the image to be displayed at the reference pixel points on the virtual flat display screen may be determined as the projection pixel values at the corresponding pixel points on the curved display screen based on the mapping relationship, such that the image to be displayed is displayed according to each projection pixel value.

In the present disclosure, the first position information of the eyes of the image observer and the second position information of the curved display screen may be obtained. Then, based on the first position information and the second position information, the position information of the virtual flat display screen may be determined. Based on the first position information and the third position information, the mapping relationship between the pixel points of the curved display screen and the reference pixel points of the virtual flat display screen may be determined. Subsequently, the corresponding projection pixel values, on the curved display screen, of the image to be displayed may be determined according to the mapping relationship and the image to be displayed may be displayed on the curved display screen according to the projection pixel values. Through the position information of the eyes of the image observer and the position information of the virtual flat display screen, the mapping relationship between the pixel points of the curved display screen and the reference pixel points of the virtual flat display screen may be determined, and the corresponding projection pixel values, on the curved display screen, of the image to be displayed may be determined according to the mapping relationship such that the image to be displayed is displayed on the curved display screen according to the projection pixel values. The display effect of the image to be displayed may be ensured and the user's visual experience may be improved.

The implementation of the various embodiments of the present disclosure in the actual application scenario will be described below.

Figure 4:
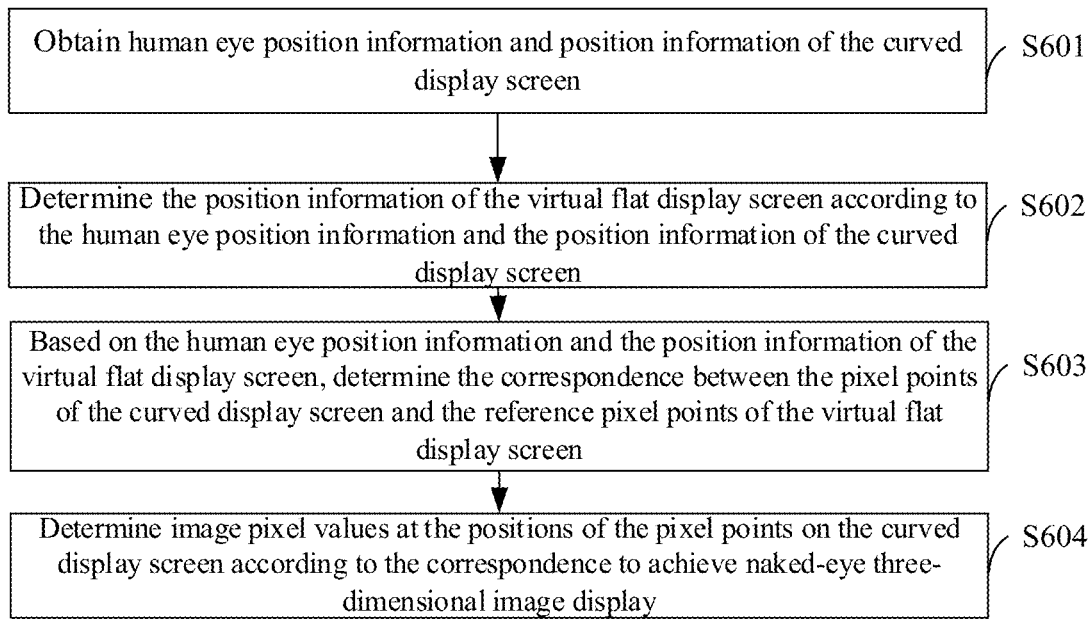
FIG. 4 is a flow chart of a naked-eye three-dimensional display method based on a curved display screen consistent with the present disclosure.

In some embodiments shown in FIG. 4 which is a flow chart of a naked-eye three-dimensional display method based on a curved display screen, the method may include S601 to S604.

In S601, human eye position information (equivalent to the first position information in other embodiments) and position information of the curved display screen (equivalent to the second position information in other embodiments) are obtained.

In some embodiments, the human eye position information may be position information of both eyes of a viewer (equivalent to the image observer in other embodiments), including a position of the left eye, a position of the right eye, an interpupillary distance, a distance to the curved display screen distance, etc. The viewer may be able to observe naked-eye three-dimensional images through the curved display screen. The position information of the curved display screen includes the current position of the curved display screen, which may be obtained in advance. In one embodiment, a camera with depth information may be installed on the curved display screen. The camera may collect the viewer's image and analyze and process the collected image to obtain the position information of the viewer's eyes in real time.

In S602, the position information of the virtual flat display screen is determined according to the human eye position information and the position information of the curved display screen.

In some embodiments, the virtual flat display screen may be a hypothetical flat display screen disposed between the curved surface display screen and the observer. According to the obtained human eye position information and the position information of the curved surface display screen, the setting position of the virtual flat display screen, that is, the position information of the virtual flat display screen, may be determined.

For example, in some embodiments, the virtual flat display screen may be disposed between the observer and the curved display screen, and located at a middle position between the observer and the curved display screen. When determining the middle position, a closest position on the curved surface display screen to the observer's eyes may be determined first, and then determine the half-way point between the closest position and the observer's eyes. The half-way point may be determined as the middle position between the observer and the curved display screen. Further, the virtual flat display screen may be set up parallel to the observer and the curved display screen to ensure that the observer is able to observe a good naked-eye three-dimensional display effect.

In S603, based on the human eye position information and the position information of the virtual flat display screen, the correspondence between the pixel points of the curved display screen and the reference pixel points of the virtual flat display screen may be determined (equivalent to determining the mapping relationship between the pixel points of the curved display screen and the reference pixel points of the virtual flat display screen according to the first position information and the third position information).

In some embodiments, the virtual flat display screen may be a naked-eye three-dimensional flat display screen, and naked-eye three-dimensional display of images may be achieved through the naked-eye three-dimensional flat display screen. When the virtual flat display screen is used to display naked-eye three-dimensional images, the first reference pixel points on the virtual flat display screen that are able to be observed by the observer's left eye, and the second reference pixel point on the virtual flat display screen that can be observed by the observer's right eye, may be determined according to the human eye position information and the position information of the virtual flat display screen.

For example, in one embodiment shown in FIG. 3, the naked-eye three-dimensional flat display screen is provided with a plurality semicircular lenses. After the light emitted by the first reference pixel points and the second reference pixel points is refracted by the plurality of semicircular lens, the light emitted by each reference pixel point (the first reference pixel points or the second reference pixel points) may converge to one direction, to the left eye or the right eye. Therefore, after the position information of the virtual flat display screen is determined, the refractive index and positions of the plurality of semicircular lens may be known. Therefore, it may be determined whether each reference pixel point on the naked-eye three-dimensional flat display screen shines into the left eye or the right eye of the observer by combining the position of the left eye of the observer, the position of the right eye of the observer, and the position information of the virtual flat display screen, obtaining the first reference pixel points corresponding to the left eye and the second reference pixel points corresponding to the right eye.

In some embodiments, after determining the first reference pixel points corresponding to the left eye and the second reference pixel points corresponding to the right eye, the first pixel points corresponding to the left eye on the curved display screen, the second pixel points corresponding to the right eye, the position information of each first pixel point, and the position information of each second pixel point may be determined. Then, based on the position information of each first pixel point and the position information of each first reference pixel point, the correspondence between each first reference pixel point and one corresponding first pixel point may be determined; and, according to the position information of each second pixel point and the position information of each second reference pixel point, the correspondence between each second reference pixel point and one corresponding second pixel point may be determined.

For example, in some embodiments, when determining the correspondence between one first reference pixel point and the corresponding first pixel point, a connection line between the first reference pixel point on the virtual flat display screen and the left eye (equivalent to the first connection in other embodiments) may be determined first. Then, the position information of the intersection between the connection line and the curved display screen may be determined. Subsequently, when one first pixel point corresponding to the left eye is determined to have the position information same as the position information of the intersection point, this first pixel point may be determined as the first pixel point corresponds to the first reference pixel point. Based on the position information of the first reference pixel point and the position information of the corresponding first pixel point, the correspondence between the first reference pixel point and the corresponding first pixel point may be established.

Figure 5:
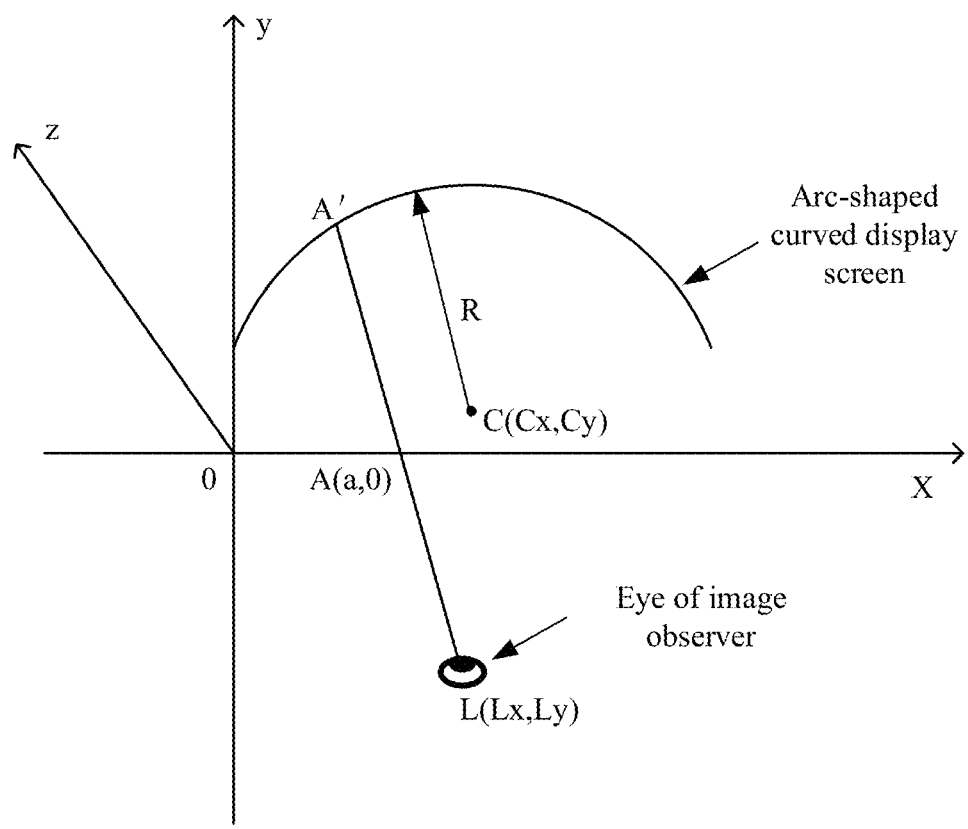
FIG. 5 is a schematic diagram of relative positions of an arc-shaped curved display screen, a virtual flat display screen, and an image viewer consistent with the present disclosure.

For example, in some embodiments, the position information of the intersection point between the connection line from the first reference pixel point to the left eye and the curved display screen may be the position coordinates of the intersection point. When determining the position coordinates of the intersection point, as shown in FIG. 5, the shape of the curved display screen may be an arc, the direction parallel to the observer's eyes may be used as the x-axis, a direction of the perpendicular line from the virtual flat display screen to the leftmost side of the curved display screen may be used as the y-axis, and the vertical direction of the virtual flat display may be used as the z-axis, to establish a three-dimensional orthogonal coordinate system. The coordinates of the observer's left eye are (Lx, Ly, 0), the coordinates of the first reference pixel point A on the virtual flat display screen, are (a, 0, 0), the point C is the center of the arc corresponding to the arc-shaped curved surface display screen in the plane of z=0 and has coordinates of (Cx, Cy, 0), and R is the radius of the circle. Assuming that the coordinates of the intersection A' between the point A and the curved display screen are (X, Y, 0), according to the geometric relationship, it may be obtained that:

$$(X-a)/(Lx-a)=Y/Ly \quad (4).$$

According to the general equation of a circle, it may be obtained that:

$$(X-Cx)^2/(Y-Cy)^2=R^2 \quad (5).$$

The coordinate values of X and Y may be obtained by combining (4) and (5), such that the coordinates of the intersection point A' on the arc-shaped curved display screen are obtained.

In S604, image pixel values (equivalent to the projection pixel values in other embodiments) at the positions of the pixel points on the curved display screen may be determined according to the correspondence and the naked-eye three-dimensional image display may be realized according to the image pixel values.

In some embodiments, the image pixel value at the positions of the corresponding pixel points on the curved display screen may be the same as the image pixel values at the positions of the corresponding reference pixel points on the virtual flat display screen. Therefore, according to the correspondence between the first reference image points and the corresponding first pixel points, the image pixel value corresponding to each first pixel point on the curved display screen may be determined. Based on the correspondence between the second reference image points and the corresponding second pixel points, the image pixel value corresponding to each second pixel point on the curved surface display screen may be determined. Subsequently, rendering may be performed according to each image pixel value to realize the naked-eye three-dimensional image display on the curved display screen.

In the present disclosure, the position information of the virtual flat display screen located between the curved display screen and the observer may be determined based on the human eye position information and the position information of the curved display screen. According to the human eye position information and the position information of the virtual flat display, the correspondence between the reference pixel points on the naked-eye three-dimensional flat display screen and the pixel points on the curved display screen may be determined, such that the image pixel value corresponding to each pixel point on the curved display screen may be determined based on this correspondence, thereby realizing naked-eye three-dimensional image display on the curved display screen. Further, the mapping method from the naked-eye three-dimensional flat display screen to the curved display screen provided by the present disclosure may support naked-eye three-dimensional display of curved display screens with any shapes. By performing naked-eye three-dimensional display on the curved display screen, a wider range of viewing angle may be provided, to enhance the observer's visual experience.

Figure 6:
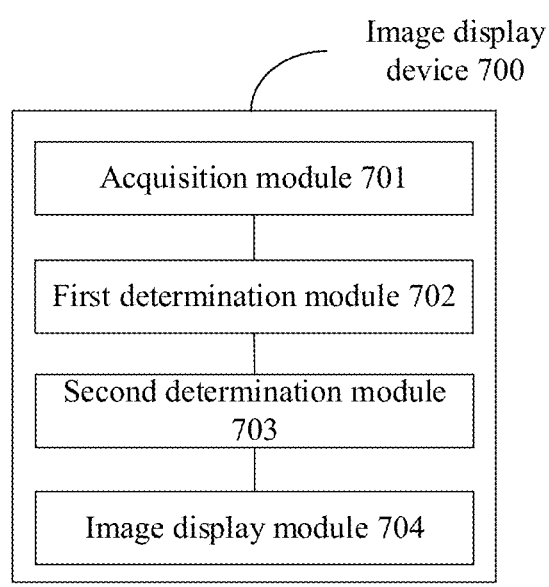
FIG. 6 is a schematic structural diagram of an image display device consistent with the present disclosure.

The present disclosure also provides an image display device. As shown in FIG. 6 which is a schematic structural diagram of an image display device provided by one embodiment of the present disclosure, in one embodiment, the image display device 700 may include:

an acquisition module 701, configured to obtain the first position information of the eyes of the image observer and the second position information of the curved display screen;

a first determination module 702, configured to determine the third position information of the virtual plane display screen based on the first position information and the second position information;

a second determination module 703, configured to determine the mapping relationship between the pixel points of the curved display screen and the reference pixel points of the virtual flat display screen based on the first position information and the third position information; and an image display module 704, configured to determine the corresponding projection pixel values, on the curved display screen, of the image to be displayed based on the mapping relationship, and display the image to be displayed on the curved surface display screen according to the projection pixel values.

In some embodiments, the first position information may include the left eye position information and the right eye position information of the image observer. The second determination module 703 may include:

a first determination sub-module, configured to determine the first reference pixel point set corresponding to the left eye on the virtual flat display screen and the second reference pixel point set corresponding to the right eye on the virtual flat display screen based on the left eye position information, the right eye position information and the third position information respectively;

a second determination sub-module, configured to determine the target position information of each first target pixel point corresponding to the left eye and the target position information of each second target pixel point corresponding to the right eye on the curved display screen; and a third determination sub-module, configured to determine the mapping relationship between each first reference pixel point and one corresponding first target pixel point based on the position information of each first reference pixel point and the target position information of each first target pixel point, and determine the mapping relationship between each second reference pixel point and one corresponding second target pixel point based on the position information of each second reference pixel point and the target position information of each second target pixel point.

In some embodiments, the third determination sub-module may include:

a first determination unit, configured to obtain the position information of the i-th first reference pixel point and determine the first connection line between the i-th first reference point and the left eye based on the position information of the i-th first reference pixel point and the left eye position information, where i is a positive integer;

a second determination unit, configured to determine the candidate position information of the intersection point between the connection line and the curved display screen;

a third determination unit, configured to determine the j-th first target pixel point with the target position information same as the candidate position information and determine the i-th first reference pixel point corresponds to the j-th first target pixel point, where j is a positive integer; and an establishment unit, configured to establish the mapping relationship between the i-th first reference pixel point and the j-th first target pixel point based on the position information of the i-th first reference pixel point and the target position information of the j-th first target pixel point.

In some embodiments, the image display module 704 may include:

an acquisition sub-module, configured to obtain the first projection pixel value of the image to be displayed at each first reference pixel point and the second projection pixel value of the image to be displayed at each second reference pixel point; and a fourth determination sub-module, configured to determine each first projection pixel value as the projection pixel value of one corresponding first target pixel point, and determine each second projection pixel value as the projection pixel value of one corresponding second target pixel point.

In some embodiments, the first determination module 702 may include:

a fifth determination sub-module, configured to determine the closest position on the curved display screen to the eye of the image observer, and determine the closest position as the candidate position; and a sixth determination sub-module, configured to determine the third position corresponding to the virtual flat display screen based on the eye position and the candidate position.

In some implementations, the sixth determination sub-module may include:

a fourth determination unit, configured to determine the middle position between the eye position and the candidate position; and a fifth determination unit, configured to determine the middle position between the eye position and the candidate position as the third position corresponding to the virtual flat display screen.

In some embodiments, the image display device 700 may further include:

a receiving module, configured to receive a control instruction for naked-eye three-dimensional image display using the curved display screen; and a response module, configured to determine the mapping relationship between the pixel points of the curved display screen and the reference pixel points of the virtual flat display screen based on the first position information and the third position information, in response to the control instruction.

The description of the image display device in the embodiments of the present disclosure is similar to the description of the above-mentioned method embodiments, and has similar beneficial effects to the method embodiments, and therefore will not be described again. For technical details not disclosed in the device embodiment, the reference may be made to the description of the method embodiments of the present disclosure.

In the present disclosure, the above image display method may be implemented in the form of a software function module and is sold or used as an independent product. It may be stored in a computer-readable storage medium. Based on this understanding, the technical solutions of the embodiments of the present disclosure or those that contribute to related solutions may be embodied in the form of software products. The computer software product may be stored in a storage medium and may include a number of instructions to enable a computer device (which may be a personal computer, a server, a network device, etc.) to execute all or part of the methods described in various embodiments of the present disclosure. The aforementioned storage medium may include: a flash disk, a mobile hard disk, a read only memory (ROM), a magnetic disk, an optical disk, or other media that is able to store program codes. As such, the embodiments of the present disclosure are not limited to any specific combination of hardware and software.

The present disclosure also provides a computer-readable storage medium on which a computer program is stored. When the computer program is executed by a processor, the image display method provided in the above embodiments may be implemented.

Figure 7:
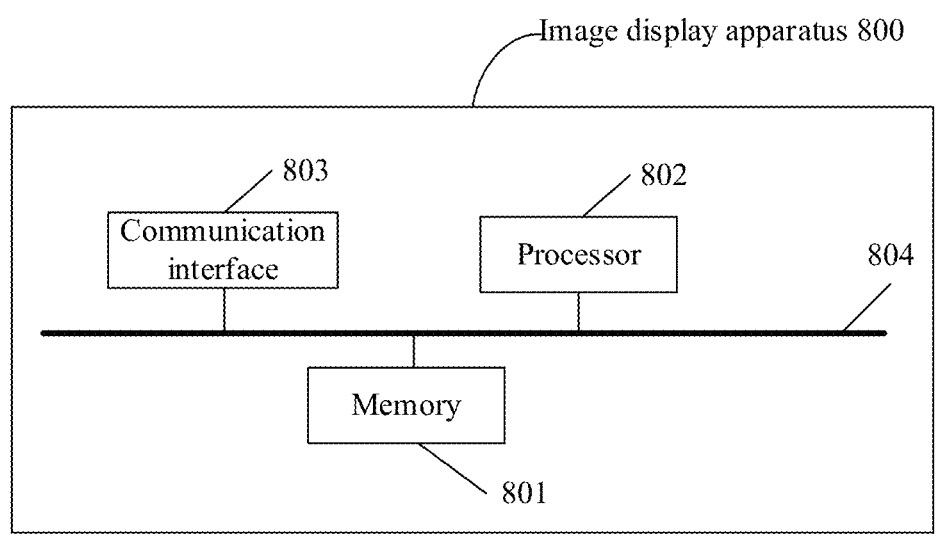
FIG. 7 is a schematic structural diagram of an image display apparatus consistent with the present disclosure.

The present disclosure also provides an image display apparatus. In one embodiment shown in FIG. 7, which is a schematic structural diagram of the image display apparatus, the image display apparatus 800 includes: a memory 801, a processor 802, a communication interface 803, and a communication bus 804. The memory 801 is configured to store executable image display instructions; the processor 802 is configured to execute the executable image display instructions stored in the memory to implement the image display methods provided in the above embodiments.

The image display apparatus and the storage medium in the embodiments of the present disclosure is similar to the description of the above-mentioned method embodiments, and has similar beneficial effects to the method embodiments, and therefore will not be described again. For technical details not disclosed in the device embodiment, the reference may be made to the description of the method embodiments of the present disclosure.

Each embodiment in this specification is described in a progressive manner, and each embodiment focuses on the difference from other embodiments. Same and similar parts of each embodiment may be referred to each other. As for the device disclosed in the embodiments, since it corresponds to the method disclosed in the embodiments, the description is relatively simple, and for relevant details, the reference may be made to the description of the method embodiments.

Units and algorithm steps of the examples described in conjunction with the embodiments disclosed herein may be implemented by electronic hardware, computer software or a combination of the two. To clearly illustrate the possible interchangeability between the hardware and software, in the above description, the composition and steps of each example have been generally described according to their functions. Whether these functions are executed by hardware or software depends on the specific application and design constraints of the technical solution. Those skilled in the art may use different methods to implement the described functions for each specific application, but such implementation should not be regarded as exceeding the scope of the present disclosure.

In the present disclosure, the drawings and descriptions of the embodiments are illustrative and not restrictive. The same drawing reference numerals identify the same structures throughout the description of the embodiments. In addition, figures may exaggerate the thickness of some layers, films, screens, areas, etc., for purposes of understanding and ease of description. It will also be understood that when an element such as a layer, film, region or substrate is referred to as being "on" another element, it may be directly on the another element or intervening elements may be present. In addition, "on" refers to positioning an element on or below another element, but does not essentially mean positioning on the upper side of another element according to the direction of gravity.

The orientation or positional relationship indicated by the terms "upper," "lower," "top," "bottom," "inner," "outer," etc. are based on the orientation or positional relationship shown in the drawings, and are only for the convenience of describing the present disclosure, rather than indicating or implying that the device or element referred to must have a specific orientation, be constructed and operated in a specific orientation, and therefore cannot be construed as a limitation of the present disclosure. When a component is said to be "connected" to another component, it may be directly connected to the other component or there may be an intermediate component present at the same time.

It should also be noted that in this article, relational terms such as "first" and "second" are only used to distinguish one entity or operation from another entity or operation, and do not necessarily require or imply that there is such actual relationship or sequence between these entities or operations them. Furthermore, the terms "comprises," "includes," or any other variation thereof are intended to cover a non-exclusive inclusion, such that an article or device including a list of elements includes not only those elements, but also other elements not expressly listed. Or it also includes elements inherent to the article or equipment. Without further limitation, an element defined by the statement "comprises a . . . " does not exclude the presence of other identical elements in an article or device that includes the above-mentioned element.

The disclosed equipment and methods may be implemented in other ways. The device embodiments described above are only illustrative. For example, the division of the units is only a logical function division. In actual implementation, there may be other division methods, such as: multiple units or components may be combined, or can be integrated into another system, or some features can be ignored, or not implemented. In addition, the coupling, direct coupling, or communication connection between the components shown or discussed may be through some interfaces, and the indirect coupling or communication connection of the devices or units may be electrical, mechanical, or other forms.

The units described above as separate components may or may not be physically separated. The components shown as units may or may not be physical units. They may be located in one place or distributed to multiple network units. Some or all of the units may be selected according to actual needs to achieve the purpose of the solution of the present disclosure.

In addition, all functional units in the embodiments of the present disclosure may be integrated into one processing unit, or each unit may be separately used as a unit, or two or more units can be integrated into one unit. The above-mentioned integration units can be implemented in the form of hardware or in the form of hardware plus software functional units.

All or part of the steps to implement the above method embodiments may be completed by hardware related to program instructions. The aforementioned program may be stored in a computer-readable storage medium. When the program is executed, the steps including the above method embodiments may be executed. The aforementioned storage media may include: removable storage devices, ROMs, magnetic disks, optical disks or other media that can store program codes.

When the integrated units mentioned above in the present disclosure are implemented in the form of software function modules and sold or used as independent products, they may also be stored in a computer-readable storage medium. Based on this understanding, the technical solutions of the embodiments of the present disclosure in essence or those that contribute to the existing technology may be embodied in the form of software products. The computer software products may be stored in a storage medium and include a number of instructions for instructing the product to perform all or part of the methods described in various embodiments of the present disclosure. The aforementioned storage media may include: mobile storage devices, ROMs, magnetic disks, optical disks, or other media that can store program codes.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. An image display method comprising:
obtaining first position information of eyes of an image observer and second position information of a curved display screen, the first position information includes left eye position information of a left eye of the image observer and right eye position information of a right eye of the image observer;
determining third position information corresponding to a virtual flat display screen based on the first position information and the second position information;
determining a mapping relationship between screen pixel points of the curved display screen and reference pixel points of the virtual flat display screen based on the first position information and the third position information, including:
determining first reference pixel points on the virtual flat display screen corresponding to the left eye and second reference pixel points on the virtual flat display screen corresponding to the right eye according to the left eye position information, the right eye position information, and the third position information;
determining first target position information of various first target pixel points on the curved display screen that correspond to the left eye and second target position information of various second target pixel points corresponding to the right eye;
determining a first mapping relationship between the first reference pixel points and the corresponding first target pixel points based on position information of the first reference pixel points and the first target position information; and
determining a second mapping relationship between the second reference pixel points and the corresponding second target pixel points based on position information of the second reference pixel points and the second target position information;
determining corresponding projection pixel values, on the curved display screen, of a target image according to the mapping relationship; and
displaying the target image on the curved display screen according to the projection pixel values.

2. The method according to claim 1, wherein determining the first mapping relationship includes:
obtaining position information of an i-th first reference pixel point, i being a positive integer;
determining a connection line between the i-th first reference pixel point and the left eye based on the position information of the i-th first reference pixel point and the left eye position information;
determining candidate position information of an intersection point of the connection line and the curved display screen;
determining a j-th first target pixel point with target position information same as the candidate position information, j being a positive integer; and
establishing a mapping relationship between the i-th first reference pixel point and the j-th first target pixel point based on the position information of the i-th first reference pixel point and the target position information of the j-th first target pixel point.

3. The method according to claim 1, wherein determining the corresponding projection pixel values includes:
obtaining first projection pixel values of the target image at the first reference pixel points as projection pixel values of the first reference pixel points; and
obtaining second projection pixel values of the target image at the second reference pixel points as projection pixel values of the second target pixel points.

4. The method according to claim 1, wherein determining the third position information includes:
determining a closest position to the eyes of the image observer on the curved display screen as a candidate position; and
determining the third position information based on positions of the eyes and the candidate position.

5. The method according to claim 4, wherein determining the third position information based on the positions of the eyes and the candidate position includes:
determining a middle position between the positions of the eyes and the candidate position as a position in the third position information.

6. The method according to claim 1, further comprising, before determining the mapping relationship, determining the corresponding projection pixel values, and displaying the target image:
receiving a control instruction instructing to perform naked-eye three-dimensional display using the curved display screen.

7. An image display apparatus comprising:
a memory storing instructions; and
a processor configured to execute the instructions to:
obtain first position information of eyes of an image observer and second position information of a curved display screen, the first position information includes left eye position information of a left eye of the image observer and right eye position information of a right eye of the image observer;
determine third position information corresponding to a virtual flat display screen based on the first position information and the second position information, including:
determining first reference pixel points on the virtual flat display screen corresponding to the left eye and second reference pixel points on the virtual flat display screen corresponding to the right eye according to the left eye position information, the right eye position information, and the third position information;
determining first target position information of various first target pixel points on the curved display screen that correspond to the left eye and second target position information of various second target pixel points corresponding to the right eye;
determining a first mapping relationship between the first reference pixel points and the corresponding first target pixel points based on position information of the first reference pixel points and the first target position information; and
determining a second mapping relationship between the second reference pixel points and the corresponding second target pixel points based on position information of the second reference pixel points and the second target position information;
determine a mapping relationship between screen pixel points of the curved display screen and reference pixel points of the virtual flat display screen based on the first position information and the third position information;
determine corresponding projection pixel values, on the curved display screen, of a target image according to the mapping relationship; and
display the target image on the curved display screen according to the projection pixel values.

8. The apparatus according to claim 7, wherein the processor is further configured to execute the instructions to:
obtain position information of an i-th first reference pixel point, i being a positive integer;
determine a connection line between the i-th first reference pixel point and the left eye based on the position information of the i-th first reference pixel point and the left eye position information;
determine candidate position information of an intersection point of the connection line and the curved display screen;
determine a j-th first target pixel point with target position information same as the candidate position information, j being a positive integer; and
establish a mapping relationship between the i-th first reference pixel point and the j-th first target pixel point based on the position information of the i-th first reference pixel point and the target position information of the j-th first target pixel point.

9. The apparatus according to claim 7, wherein the processor is further configured to execute the instructions to:
obtain first projection pixel values of the target image at the first reference pixel points as projection pixel values of the first reference pixel points; and
obtain second projection pixel values of the target image at the second reference pixel points as projection pixel values of the second target pixel points.

10. The apparatus according to claim 7, wherein the processor is further configured to execute the instructions to:
determine a closest position to the eyes of the image observer on the curved display screen as a candidate position; and
determine the third position information based on positions of the eyes and the candidate position.

11. The apparatus according to claim 10, wherein the processor is further configured to execute the instructions to:
determine a middle position between the positions of the eyes and the candidate position as a position in the third position information.

12. The apparatus according to claim 7, wherein the processor is further configured to execute the instructions to, before determining the mapping relationship, determining the corresponding projection pixel values, and displaying the target image:
  receive a control instruction instructing to perform naked-eye three-dimensional display using the curved display screen.

13. A non-transitory computer-readable storage medium storing instructions that, when executed by a processor, cause the processor to:
  obtain first position information of eyes of an image observer and second position information of a curved display screen, the first position information includes left eye position information of a left eye of the image observer and right eye position information of a right eye of the image observer;
  determine third position information corresponding to a virtual flat display screen based on the first position information and the second position information;
  determine a mapping relationship between screen pixel points of the curved display screen and reference pixel points of the virtual flat display screen based on the first position information and the third position information, including:
    determining first reference pixel points on the virtual flat display screen corresponding to the left eye and second reference pixel points on the virtual flat display screen corresponding to the right eye according to the left eye position information, the right eye position information, and the third position information;
    determining first target position information of various first target pixel points on the curved display screen that correspond to the left eye and second target position information of various second target pixel points corresponding to the right eye;
    determining a first mapping relationship between the first reference pixel points and the corresponding first target pixel points based on position information of the first reference pixel points and the first target position information; and
    determining a second mapping relationship between the second reference pixel points and the corresponding second target pixel points based on position information of the second reference pixel points and the second target position information;
  determine corresponding projection pixel values, on the curved display screen, of a target image according to the mapping relationship; and
  display the target image on the curved display screen according to the projection pixel values.

14. The storage medium according to claim 13, wherein the instructions further cause the processor to:
  obtain position information of an i-th first reference pixel point, i being a positive integer,
  determine a connection line between the i-th first reference pixel point and the left eye based on the position information of the i-th first reference pixel point and the left eye position information;
  determine candidate position information of an intersection point of the connection line and the curved display screen;
  determine a j-th first target pixel point with target position information same as the candidate position information, j being a positive integer; and
  establish a mapping relationship between the i-th first reference pixel point and the j-th first target pixel point based on the position information of the i-th first reference pixel point and the target position information of the j-th first target pixel point.

15. The storage medium according to claim 13, wherein the instructions further cause the processor to:
  obtain first projection pixel values of the target image at the first reference pixel points as projection pixel values of the first reference pixel points; and
  obtain second projection pixel values of the target image at the second reference pixel points as projection pixel values of the second target pixel points.

16. The storage medium according to claim 13, wherein the instructions further cause the processor to:
  determine a closest position to the eyes of the image observer on the curved display screen as a candidate position; and
  determine the third position information based on positions of the eyes and the candidate position.

17. The storage medium according to claim 16, wherein the instructions further cause the processor to:
  determine a middle position between the positions of the eyes and the candidate position as a position in the third position information.

* * * * *